United States Patent
Fitzgibbon et al.

(10) Patent No.: US 6,995,533 B2
(45) Date of Patent: Feb. 7, 2006

(54) CONTROLLED TORQUE DRIVE FOR A BARRIER OPERATOR

(75) Inventors: James J. Fitzgibbon, Batavia, IL (US); Edward Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 91 days.

(21) Appl. No.: 10/423,765

(22) Filed: Apr. 25, 2003

(65) Prior Publication Data

US 2004/0212335 A1 Oct. 28, 2004

(51) Int. Cl.
  *H02P 1/00* (2006.01)

(52) U.S. Cl. .................. 318/434; 318/445; 318/467; 318/266

(58) Field of Classification Search ......... 318/282–289, 318/266, 467, 466, 267, 434, 603; 49/28, 49/139
See application file for complete search history.

(56) References Cited

U.S. PATENT DOCUMENTS

| | | | |
|---|---|---|---|
| 2,751,219 A | 6/1956 | Dodge | |
| 3,376,489 A | 4/1968 | Caputo | |
| 3,498,434 A | 3/1970 | Richmond | |
| 3,891,909 A | * 6/1975 | Newson | 318/469 |
| 4,263,536 A | * 4/1981 | Lee et al. | 318/266 |
| 4,369,399 A | * 1/1983 | Lee et al. | 318/467 |
| 4,386,398 A | * 5/1983 | Matsuoka et al. | 700/90 |
| 5,218,282 A | * 6/1993 | Duhame | 318/603 |
| 5,557,887 A | * 9/1996 | Fellows et al. | 49/28 |
| 5,747,956 A | 5/1998 | Lamm | |
| 6,111,374 A | * 8/2000 | Fitzgibbon et al. | 318/282 |
| 6,133,703 A | * 10/2000 | Fitzgibbon et al. | 318/445 |
| 6,161,438 A | 12/2000 | Mullet et al. | |
| 6,400,112 B1 | * 6/2002 | Fitzgibbon et al. | 318/445 |
| 6,597,138 B2 | * 7/2003 | Fitzgibbon | 318/434 |

FOREIGN PATENT DOCUMENTS

GB    2 282 639 A    4/1995

OTHER PUBLICATIONS

Search Report for British Patent Application GB0409097.3 completed Sep. 17, 2004.

* cited by examiner

*Primary Examiner*—Paul Ip
(74) *Attorney, Agent, or Firm*—Fitch, Even, Tabin & Flannery

(57) ABSTRACT

A controlled torque drive for a motor of a barrier operator including a current sensor coupled to a current conducting path that is in series with the motor. The current sensor is configured to sense the current level in the current conducting path and provide a signal indicative of the current level in the current conducting path to a current controller that restricts the current level to the motor when an obstruction is encountered by the movable barrier. The current controller continues to restrict current to the motor for a period of time while the motor attempts to move the movable barrier through an obstruction. In variations, the current to the motor is limited by an analog current controller, and in other variations, current is limited by a digital current controller.

23 Claims, 4 Drawing Sheets

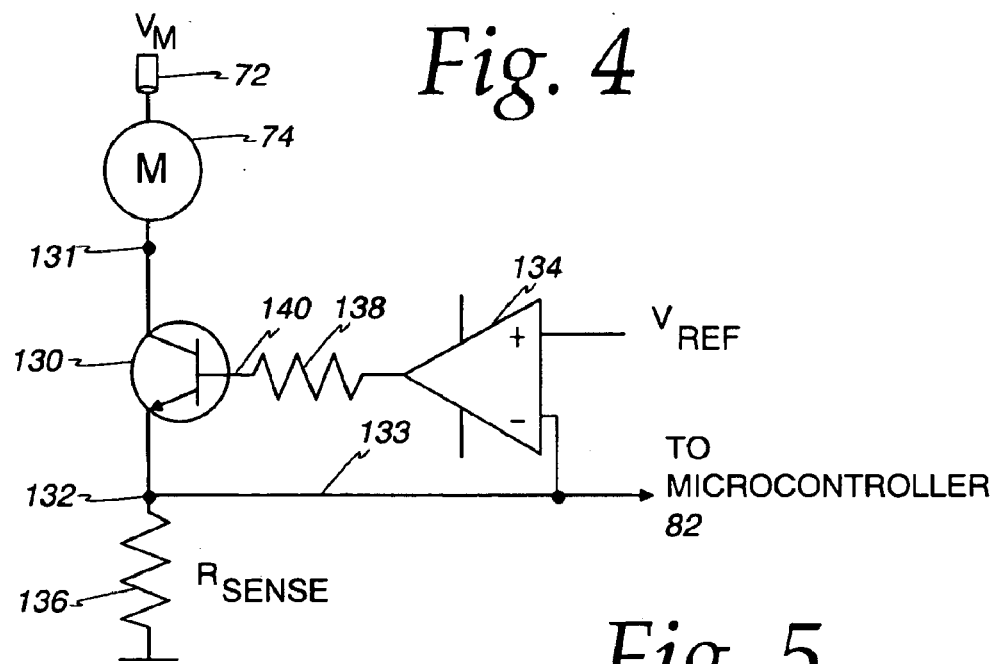
*Fig. 4*
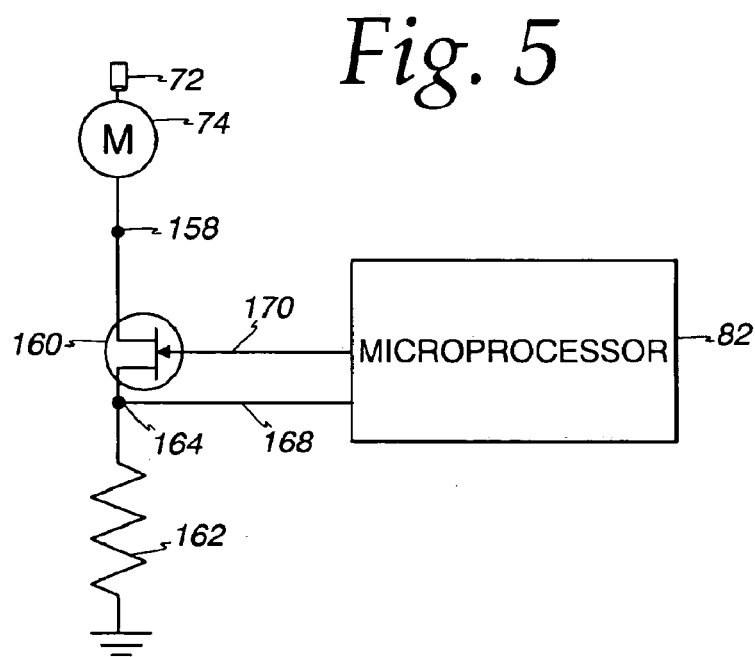
*Fig. 5*
*Fig. 6*
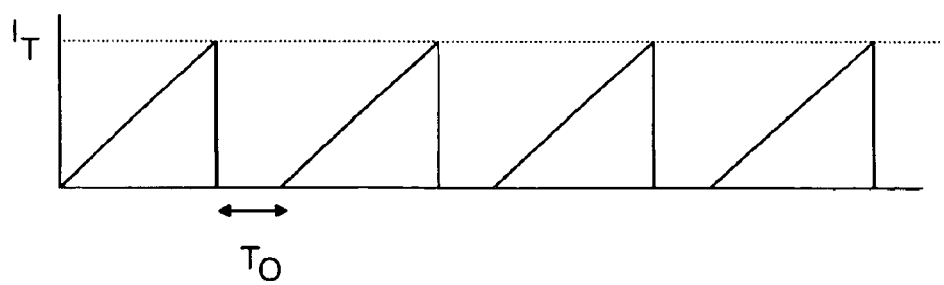

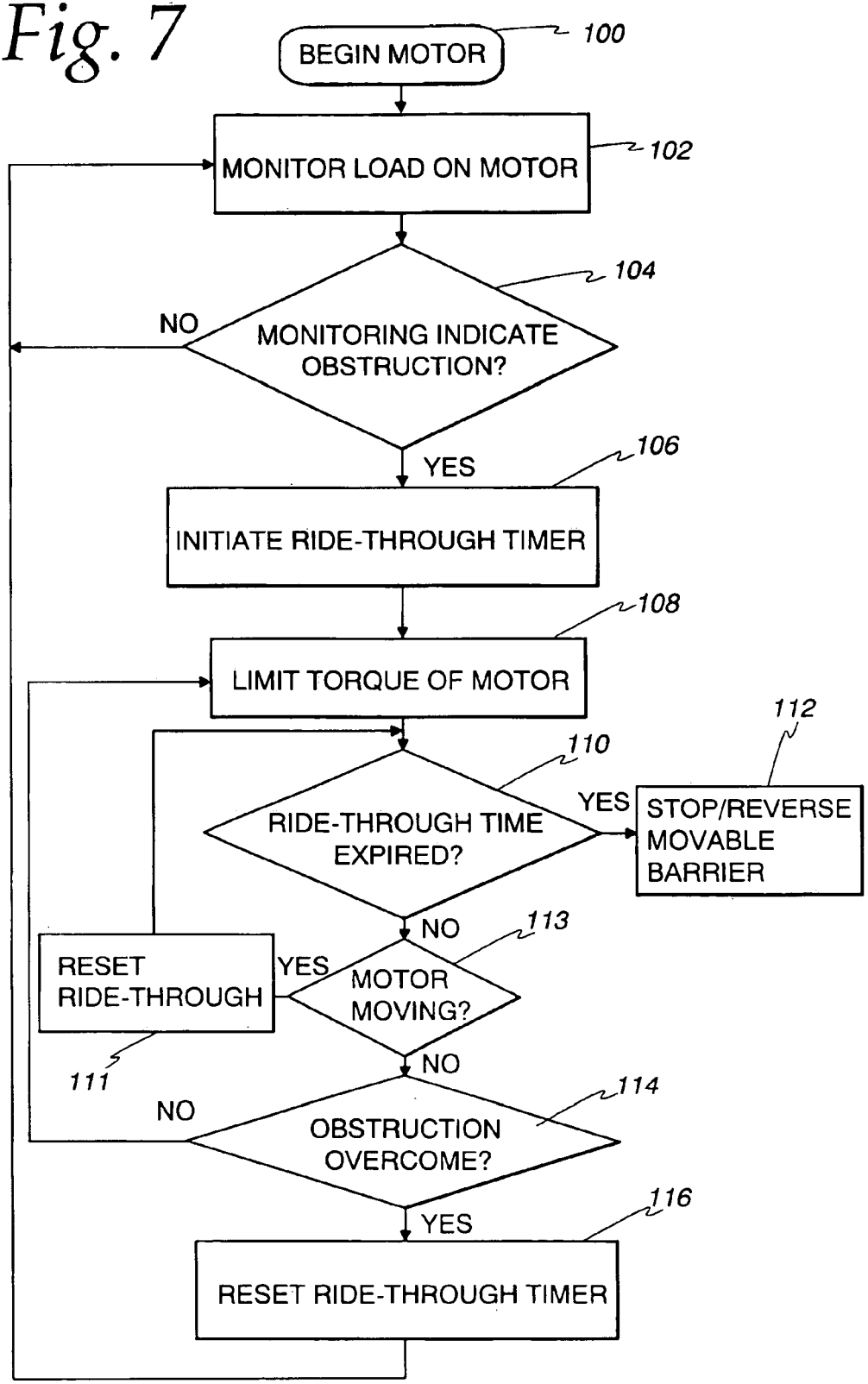

CONTROLLED TORQUE DRIVE FOR A BARRIER OPERATOR

BACKGROUND OF THE INVENTION

1. Field of the Invention

The present invention relates in general to a movable barrier operator for opening and closing a movable barrier or door. More particularly, the invention relates to a movable barrier operator with a designed response to the movable barrier encountering an obstruction.

2. Discussion of the Related Art

A number of garage door operators have been sold over the years. Most garage door operators include a head unit containing a motor having a transmission connected to it, which may be a chain drive or a screw drive, which is coupled to a garage door for opening and closing the garage door. The garage door is typically positioned for movement along a pair of door rails that are mounted to a ceiling of the garage. For reasons of safety garage door operators, when in a closing mode and contacting an obstruction reverse and open the door in order to prevent damage to property and injury to persons.

Known garage door operators typically include optical detection systems located near the bottom of the travel of the door to prevent the door from closing on objects or on persons that may be in the path of the door. In addition to optically sensing obstructions, garage door operators are known to include systems that detect an operating speed of the garage door operator, and when an obstruction interferes with movement of the garage door, and hence, slows the operating speed of the garage door opener, the direction of the garage door movement is reversed.

Occasionally, known garage door operators reverse directions in response to being slowed by false obstructions that impede the path of the garage door. Such false obstructions, for example, dirt in the garage door rails, causes the speed of the garage door to slow down just enough to trigger the garage door operator to reverse directions. These false obstructions are an annoyance to the users of barrier movement systems.

SUMMARY OF THE INVENTION

To avoid the problem of improperly reversing a closing barrier, the present arrangement includes a method, and apparatus for operating a motor used to move a movable barrier in which the load on the motor is monitored while moving the moveable barrier and the torque of the motor is controlled during a ride-through period to push the barrier through minor obstructions. Should the required force be too large or last for too long a real obstruction is assumed and the direction of the barrier is reversed.

The apparatus includes a current conducting path coupled in series with a power supply and the motor, and a current sensor coupled to the current conducting path that is configured to sense the current level in the current conducting path and provide a signal indicative of the current level in the current conducting path. The apparatus also includes a current controller that restricts the current level through the current conducting path in response to the movable barrier encountering an obstruction while the motor attempts to move the movable barrier through the obstruction during the ride-through period that begins when the movable barrier encounters the obstruction.

BRIEF DESCRIPTION OF THE DRAWINGS

A complete understanding may be gained from the following disclosure when read in conjunction with the following drawings wherein:

FIG. 4 is a schematic diagram of the current controller of FIG. 2 according to one embodiment;

FIG. 5 is a schematic diagram of the current controller of FIG. 2 according to another embodiment; and FIG. 6 is a graph showing current provided to the motor by the current controller of FIG. 5 when the movable barrier encounters on obstruction; and FIG. 7 is a flow chart of actions performed during an example in which a ride-through timer is possibly extended.

Corresponding reference characters indicate corresponding components throughout the several views of the drawings.

DETAILED DESCRIPTION

Figure 1:
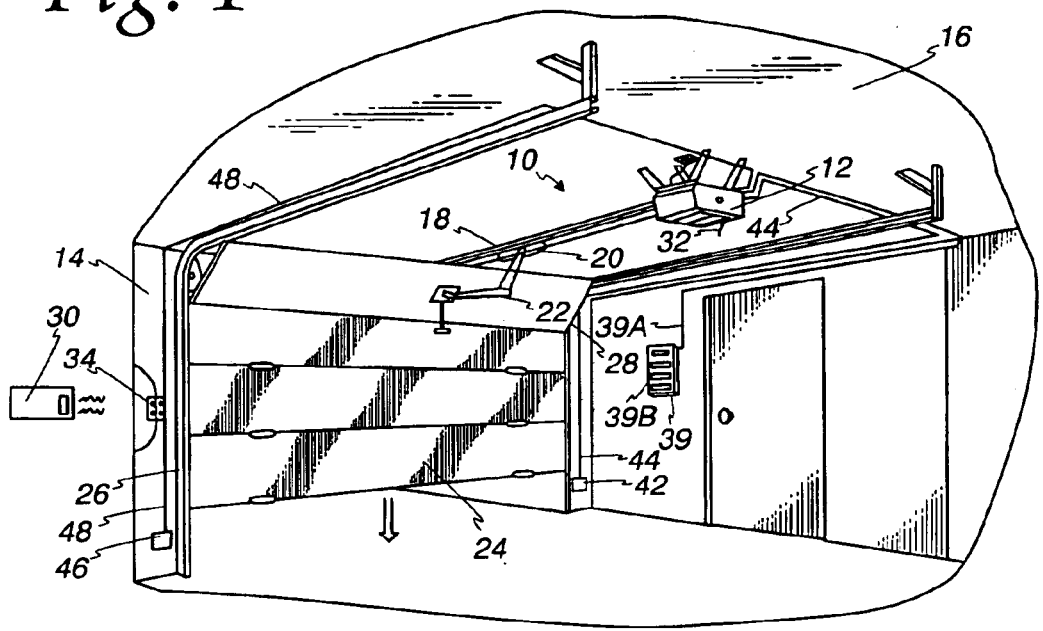
FIG. 1 is a perspective view of a garage having mounted within it a movable barrier operator.

FIG. 1, shows a perspective view of a garage having mounted within it, a movable barrier operator. In FIG. 1 the movable barrier is a garage door while other barriers such as gates, hinged doors etc. may be benefitted by the disclosed system. A movable barrier operator 10 includes a head unit 12 mounted to the ceiling 16 of the garage 14. The movable barrier operator 10 includes a drive rail 18 extending therefrom with a trolley 20 attached having an arm 22 extending to a movable barrier 24 positioned for movement along a pair of door rails 26 and 28. Within the head unit is a motor to move the movable barrier 24 via a chain or screw drive in the drive rail 18 that is coupled to the releasable trolley 20.

The system includes a hand-held transmitter unit 30 adapted to send control signals to an antenna 32 positioned on the head unit 12 and coupled to a receiver as will appear hereinafter. A switch module or wall control 39 is mounted on a wall of the garage, and is connected to the head unit by a pair of wires 39a. The switch module 39 includes a command switch 39b to open and close the garage door 24. An optical emitter 42 is connected via a power and signal line 44 to the head unit 12. An associated optical detector 46 is coupled to the to the head unit 12 via a wire 48.

The head unit 12 includes a programmed microcontroller 82 which receives signals from the ancillary equipment such as transmitter 30, wall controller 39 and optical transmitter and receiver 42 and 46 and controls the power applied to the driving motor.

In operation, when the movable barrier 24 is in an open position, and a close command is initiated, for example, by a user depressing the command switch 39b key on the control pad 39, or a button on the transmitter unit 30, the motor in the head unit begins to move a chain or screw drive in the rail 18 that in turn moves the trolley 20. The movable barrier 24 is thus pushed along by the arm 22 that is coupled to the releasable trolley 20.

When dirt, debris or miss match in the door rails 26, 28 and/or drive rail 18 hinder movement of the movable barrier 24, instead of immediately stopping, the operator 10, limits the torque of the motor for a ride-through period to allow the operator 10 to drive the barrier through the hindrance. When an obstruction is first encountered, the motor is maintained active, but the torque of the motor is controlled for a short ride-through period of time, e.g., less than two seconds, to reduce the force the operator imparts to, for example, 15 to 25 pounds. Because the torque of the motor is limited, the speed of the motor drops when an obstruction is encountered, and the amount of force imparted by the motor is concomitantly reduced during the ride-through period. In this way, the amount of force imparted by the movable barrier is limited to prevent dangerous levels force, e.g., up to 200 pounds, that would otherwise be produced when torque of the operator motor is not limited. If the obstruction is overcome during the ride-through period, the operator 10 and the operator motor will resume normal operating speeds. If, however, the obstruction is not overcome during the ride-through period, then the movable barrier stops and/or reverses.

Figure 2:
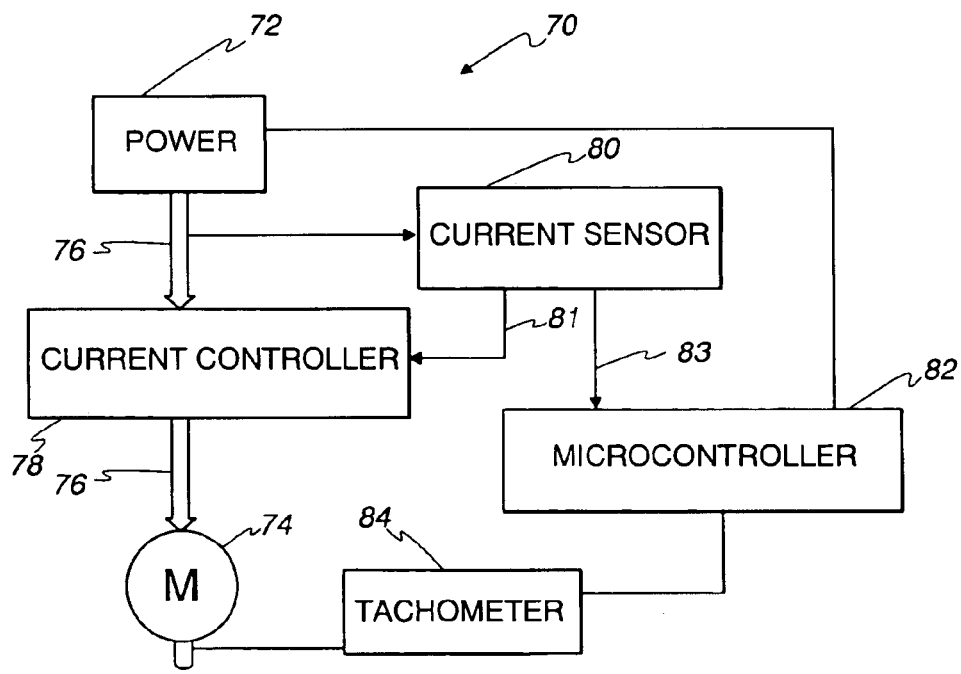
FIG. 2 is a functional block diagram of a controlled torque drive for a motor of the movable barrier operator of FIG. 1 in accordance with one embodiment.

Because torque output from a direct current motor is directly proportional to the current into the motor, current to the motor is controlled to control torque of the motor. FIG. 2 is a functional block diagram of a current controlled torque limiting drive 70 for the operator of FIG. 1. FIG. 2 includes a power supply 72, that provides power to a motor 74 of the movable barrier operator 10 through a current conducting path 76. Within the current conducting path is a current controller 78. A current sensor 80 couples to both the current controller 78 and the current path 76. Microcontroller 82 is coupled with the power supply 72, the current sensor 80, and a tachometer 84 which is coupled to the motor 74 for sensing the rotations thereof.

Figure 3:
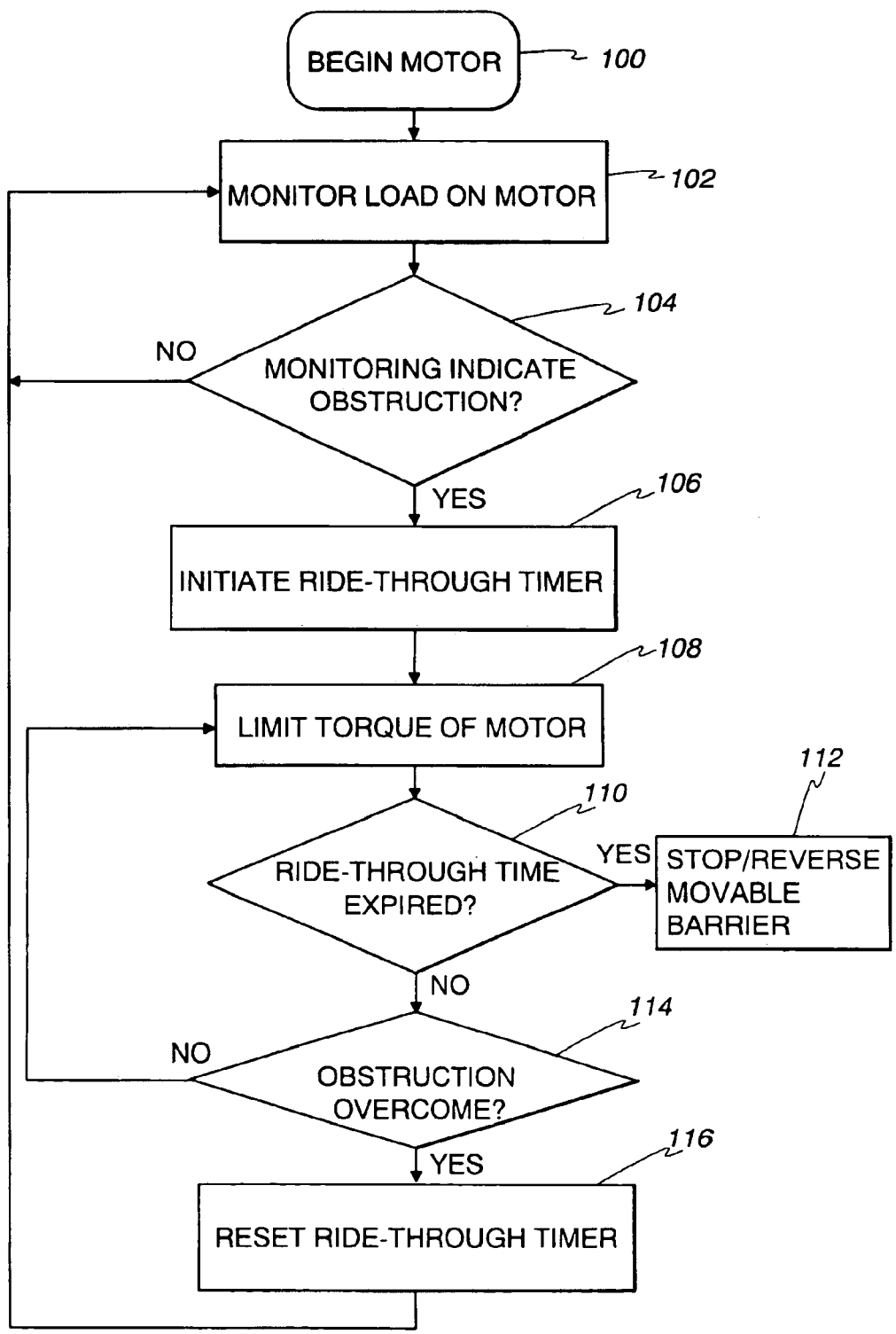
FIG. 3 is a flowchart illustrating steps performed by the controlled torque drive of FIG. 2 when operating the motor of the movable barrier operator.

While referring to FIG. 2, concurrent reference will be made to FIG. 3, which is a flowchart illustrating one embodiment of steps performed by the controlled torque drive of FIG. 2.

The motor 74 is positioned in the head unit 12, of a movable barrier operator, and the motor receives electrical current from the power supply 72 via the current conducting path 76 and converts the electrical current to mechanical energy that drives the movable barrier 24. When the movable barrier 24 is in an open position and a user initiates its closure, electrical current is provided via the current conducting path 76, through the current controller 78 to the motor 74. In response, the motor 74 begins to move (Step 100) and linkages from the motor 74 begin moving the movable barrier 24. During a brief start-up period the obstruction forces on the barrier are ignored by controller 82. After the start-up period flow proceeds from block 100 to block 102 in which the motor is monitored. While the motor 74 is moving the movable barrier 24, the tachometer 84 measures a speed of the motor 74 and provides a tachometer signal indicative of the motor speed to the microcontroller 82. Under normal operating conditions, i.e., when there are no significant obstructions to movement of the movable barrier 24, the motor 74 will operate within a predetermined normal operating speed range. If the movable barrier encounters an obstruction, however, the speed of the motor 74 will drop from its normal operating speed range and the microcontroller 82 will receive a tachometer signal that reflects the slower speed of the motor 74. Thus, the tachometer monitors a load on the motor (Step 102), and if the monitoring indicates there is an obstruction (Step 104), i.e., the microcontroller 82 receives a tachometer signal that reflects a drop in motor speed, the microcontroller 82 initiates a ride-through timer (Step 106). It should be mentioned that the load on the motor 74 might also be monitored by the current sensor 80 by means of a conduction path 83. With the current sensing, the current sensor provides a signal to the microcontroller which interprets an increase in the current in the current conducting path 76 as a possible obstruction and initiates a ride-through timer.

Initiation of the ride through timer begins a ride-through period the interval of which may be determined by the circumstances of barrier movement operator use. For example, the interval may be 1½ to 2 seconds for normal use and it maybe less than one second for sensitive use. The ride-though timer of the present example is implemented by the microcontroller 82, but as one of ordinary skill the art recognizes, there are other techniques to implement a timer with well known and readily available hardware or software.

After the ride-though timer is initiated, the torque of the motor is limited (Step 108), and until the ride-through period has expired, the motor 74 continues to operate at controlled torque in an attempt to move the movable barrier 24 through the obstruction. The torque of the motor 74 is limited by the current controller 78 that limits the level of current in the current conducting path 76, and hence, limits the level of current driving the motor 74. The current controller 78 receives a current level signal 81 from the current sensor 80 that is indicative of the level of current in the current conducting path 76, and the current controller 78 adjusts the level of current in the current conducting path 76 in response to the current level signal 81 from the current sensor 80. The current level signal 81 sent from the current sensor 80 to the current controller 78 is a continuous and variable analog signal, that is indicative of the current level in the current conducting path 76. By design, the current level signal 81 occurs at a particular level when an obstruction is encountered and the current in the current conducting path 76 reaches a threshold current. The current controller 78 may be an analog current controller that limits the current to the motor 74 by increasing an impedance of the current conducting path 76 in proportion to the magnitude of the current in the current conducting path 76 while the motor 74 attempts to move the movable barrier 24 through the obstruction. Alternatively, the current controller 78 may momentarily interrupt the current conducting path 76 when the current level in the current conducting path 76 reaches a threshold and intermittently closes the conducting path to provide an average current that limits the torque of the motor 74 while the motor attempts to move the movable barrier through an obstruction.

If the ride-through period expires (Step 110) and the obstruction has been overcome (Step 114), then the ride-through timer is reset (Step 116) and monitoring of the load on the motor 74 continues (Step 102). If the ride-through time has expired (Step 110), and the obstruction has not been overcome (Step 114), then the microcontroller 82 stops and/or reverses the current in the current conducting path; thus, stopping and/or reversing the movable barrier (Step 112).

Referring next to FIG. 4, shown is one embodiment of an analog controlled current sink that performs the functions of the current controller of FIG. 2. Shown is the motor 74 and coupled to the motor 74 is the power supply 72. The motor is also coupled to a collector of a transistor 130 at node 131. An emitter of the transistor 130 is coupled to a node 132 that also serves as an input to a non inverting input of an operational amplifier (OpAmp) 134. A first terminal of a sense resister 136 is coupled to node 132 and a second terminal of sense resistor 136 is coupled to ground. A non-inverting terminal of OpAmp 134 is coupled to a reference voltage labeled $V_{REF}$, and resistor 138 couples an output of the OpAmp 134 to a base of transistor 130. The collector and emitter of transistor 130 form a collector-emitter conducting path that is a portion of a conducting path that runs between node 131 to ground and includes sense resistor 136. The motor 74 is connected in series with the current conducting path, and thus, current in the current conducting path is equal to the current provided to the motor 74. Because the voltage at node 132 is directly related to the current in the current conducting path, the OpAmp 134 monitors the current in the motor by monitoring the current level signal 133, and hence, the OpAmp 134 effectively monitors the load on the motor 74.

In operation, before the power supply 72 starts supplying power to the motor 74, there is no current flowing through the current conducting path between node 131 (including a collector-emitter channel of the transistor 130) and ground, and hence, a voltage at node 132 is less than $V_{REF}$ which is set to a potential above ground. Thus, the output of the OpAmp 134 is a positive potential that induces a current through resistor 138 that results in a current control signal 140 at the base of the transistor 130 that is high enough to saturate the transistor 130.

When the power supply 72 initially provides power to the motor 74, the current conducting path between node 131 and ground has a relatively low impedance, and current flows in the current conducting path and induces a potential at node 132 $V_{REF}$ is set high enough to keep transistor 130 saturated when the motor 74 is under a normal load, and drawing a normal operating current.

If the movable barrier 24 encounters an obstruction, however, the current in the current conducting path increases because the motor draws more current. This causes the potential at node 132, and hence, the level signal 133 to approach $V_{REF}$, and in response, the OpAmp 134 reduces the current control signal 140 at the base of the transistor 130. The reduced current control signal 140 at the base of transistor 130 causes the transistor 130 to become active and limit the current in the current conducting path, and thus, the torque of the motor 74.

Referring next to FIG. 5, shown is one embodiment of a digital controlled current sink that performs the functions of the current controller and current sensor of FIG. 2. Shown is the motor 74 coupled in series with the power supply 74 and a drain terminal of a transistor 160 at node 158. A source terminal of the transistor 160 is coupled to a terminal of a sense resistor 162 at node 164 which serves as an input to microcontroller 82 via sense line 168, and an output of the microcontroller 82 is coupled to a gate of the transistor 160. Because the voltage at node 164 and the current level signal 168 is directly related to the current in the current conducting path, the microcontroller 82 effectively monitors the current in the motor 74, and hence, the load on the motor 74. The current controller 78 discussed with reference to FIG. 2 comprises a combination of the transistor 130 and the microcontroller 82. As shown in FIG. 5, the transistor 160 is a field effect transistor, and a drain-source conducting path is a portion of a conducting path in series with the motor 74 that runs between node 158 to ground and includes sense resistor 162. The motor 74 is connected in series with the current conducting path, and thus, current in the current conducting path is equal to the current provided to the motor 74.

In operation, when the motor 74 is first started, the microcontroller 82 provides a current control signal 170 to the transistor 160 to maintain a closed drain-source conducting channel. Thus, when the motor 74 is first started, the current conducting path from node 158 to ground is a relatively low impedance current conducting path that allows a current level in the current conducting path to increase to a normal operating level.

The current level in the current conducting path produces a potential at node 164 that is provided as the current level signal 168 to the microcontroller 82. The microcontroller 82 continually monitors the current level signal 168, and hence, the current to the motor 74. When there is no obstruction encountered, the motor 74 draws a normal operating current and the voltage at node 164 remains below a threshold voltage.

Referring to FIG. 6, shown is a graphical representation of the current in the current conducting path of FIG. 5 with respect to time when the movable barrier 24 encounters an obstruction. As shown in FIG. 6, when an obstruction is encountered, current in the current conducting path reaches a threshold, labeled $I_T$, and the microcontroller 82 senses a corresponding threshold voltage at node 164 via the current level signal 168. In response, the microcontroller 82 provides an off signal to the transistor 170 that turns the transistor off for a period of time shown by $t_o$. Thus, the transistor 160, in response to the microcontroller 82, effectively creates an open circuit along the drain-source conducting path of the transistor 160 for the period $t_o$.

In response to the open circuit, the current in the current conducting path falls to zero, as shown in FIG. 6, for the time period $t_o$. In this way, the average current in the current conducting path, and hence, provided to the motor 74, is limited when an obstruction is encountered. Thus, torque is reduced during a ride-through period by switching current to the motor 74 on and off.

In the preceding examples the ride-through timer is reset when a sensed obstruction is overcome during a fixed ride-through period. FIG. 7 represents an alternative flow diagram to the fixed ride-through period provided by the flow diagram of FIG. 3. The object of the FIG. 7 flow diagram is to extend the ride-through period when the motor (barrier) continues to move while the motor is operating in the limited torque mode. The FIG. 7 flow diagram is executed as described with regard to FIG. 3 through the decision block 110 which is executed to identify whether the ride-through period has expired. When the ride-through period expires flow proceeds from block 110 to block 112 where the motor is stopped and/or reversed. When block 110 determines that the ride-through timer has not expired, flow proceeds to a block 113 to determine whether the motor is still moving. In block 113 the motor speed is compared to a predetermined speed value which may be for example ½ of the normal motor movement speed. When the motor speed exceeds the predetermined speed value the ride-through timer is reset to it's start value in block 111 and flow continues back to block 110. Alternatively, when block 113 determines that the motor speed is less than the predetermined speed value flow proceeds to block 114 which is performed as discussed with regard to FIG. 3.

While the invention herein disclosed has been described by means of specific embodiments and applications thereof, numerous modifications and variations could be made thereto by those skilled in the art without departing from the scope of the invention set forth in the claims.

What is claimed is:

1. A method of operating a motor used to move a movable barrier, comprising the steps of:
   activating the motor to move the moveable barrier;
   monitoring a load on the motor while moving the moveable barrier;
   initiating a ride-through period in response to the monitoring step indicating that an obstruction has been encountered; and
   limiting torque of the motor during the ride-through period while attempting to move the movable barrier through the obstruction.

2. The method of claim 1 further comprising:
stopping the motor when the obstruction remains at an expiration of the ride-through period.

3. The method of claim 1 comprising reversing the motor when the obstruction remains at the expiration of the ride-through period.

4. The method of claim 1 comprising disabling the ride-through timer when the obstruction is overcome.

5. The method of claim 1, wherein the step of monitoring the load on the motor comprises monitoring an electrical current driving the motor.

6. The method of claim 1, wherein the step of monitoring the load on the motor comprises monitoring a speed of the motor.

7. The method of claim 1, wherein the step of limiting torque of the motor comprises limiting an electrical current driving the motor.

8. The method of claim 7, wherein the step of limiting electrical current comprises limiting the current with an analog controller.

9. The method of claim 7, wherein the step of limiting electrical current comprises limiting the current with a digital controller.

10. The method of claim 1 comprising increasing the ride-through period when the torque of the motor is being limited and the motor continues to move.

11. The method of claim 10 comprising increasing the ride-through period when the motor speed exceeds a predetermined motor speed.

12. An apparatus for controlling a motor used to move a movable barrier comprising:
a current sensor, coupled to the motor, configured to sense an increase in current drawn by the motor due to the movable barrier encountering an obstruction;
a timer configured to initiate a ride-through period in response to the movable barrier encountering the obstruction; and
a current controller, coupled to the motor, configured to allow the motor to draw a restricted amount of current during the ride-through period to attempt to move the movable barrier through the obstruction in response to the current sensor sensing an increase in current drawn by the motor.

13. The apparatus of claim 12 further comprising:
a tachometer coupled to the motor and the timer, wherein the tachometer provides an obstruction signal in response to the movable barrier encountering the obstruction;
wherein the timer initiates the ride-through period in response to receiving the obstruction signal from the tachometer.

14. The apparatus of claim 12 wherein the current controller comprises a semiconductor device coupled to the current sensor; and
wherein a conducting path of the semiconductor device is connected in series with the motor and is controlled to restrict the current to the motor during the ride-through period.

15. The apparatus of claim 12 wherein the current controller comprises an operational amplifier with an input coupled to the current sensor and another input coupled to a reference potential;
wherein the operational amplifier produces a current control signal that controls an impedance of the semiconductor device conducting path.

16. The apparatus of claim 12 wherein the current controller comprises:
a transistor comprising a switched conducting path in series with the motor and a control electrode to open and close the switched conducting path;
a microcontroller coupled to the current sensor and to the gate of the transistor wherein the microcontroller provides an open signal to the gate of the transistor in response to the increase in current drawn by the motor due to the movable barrier encountering the obstruction and provides a close signal to the gate in response to the switched conducting path being open for a time period;
wherein the transistor opens the switched conducting path in response to the open signal from the microcontroller and closes the switched conducting path in response to the close signal from the microcontroller to provide the restricted amount of current to the motor during the ride-through period.

17. An apparatus for controlling a motor used to move a movable barrier comprising:
means for activating the motor to move the moveable barrier;
means for monitoring a load on the motor while moving the moveable barrier;
means for initiating a ride-through period in response to the means for monitoring; and
means for limiting torque of the motor during the ride-through period while attempting to move the movable barrier.

18. The apparatus of claim 15 further comprising:
means for stopping the motor at an expiration of the ride-through period in response to a failure to move through the obstruction during the ride-though period.

19. The apparatus of claim 15 wherein the means for monitoring the load on the motor comprises means for monitoring an electrical current driving the motor.

20. The apparatus of claim 15, wherein the means for monitoring the load on the motor comprises means for monitoring a speed of the motor.

21. The apparatus of claim 15, wherein the means for limiting torque of the motor comprises limiting an electrical current driving the motor.

22. The apparatus of claim 19, wherein the means for limiting electrical current comprises limiting the current with an analog current controller.

23. The apparatus of claim 19, wherein the means for limiting electrical current comprises limiting the current with a digital current controller.

* * * * *